United States Patent
Roberts (10) Patent No.: US 10,997,873 B2
(45) Date of Patent: May 4, 2021

(54) RIDE QUALITY ELEVATOR SIMULATOR

(71) Applicant: OTIS ELEVATOR COMPANY, Farmington, CT (US)

(72) Inventor: Randy Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 356 days.

(21) Appl. No.: 16/046,367

(22) Filed: Jul. 26, 2018

(65) Prior Publication Data

US 2020/0035129 A1  Jan. 30, 2020

(51) Int. Cl.
*G09B 25/02* (2006.01)

(52) U.S. Cl.
CPC .................. *G09B 25/02* (2013.01)

(58) Field of Classification Search
CPC ................ G09B 25/00; G09B 25/02
See application file for complete search history.

(56) References Cited

U.S. PATENT DOCUMENTS

| | | |
|---|---|---|
| 4,370,717 A | 1/1983 | Hummert et al. |
| 5,308,938 A | 5/1994 | Roberts et al. |
| 5,329,077 A | 7/1994 | Skalski et al. |
| 5,652,414 A | 7/1997 | Roberts et al. |
| 5,892,190 A | 4/1999 | Morita et al. |
| 5,930,136 A | 7/1999 | Nakajima et al. |
| 7,424,934 B2 | 9/2008 | Husmann et al. |
| 8,768,522 B2 | 7/2014 | Wang et al. |
| 9,675,894 B2 | 6/2017 | Vatcher et al. |
| 2014/0302462 A1* | 10/2014 | Vatcher ................ A63G 31/16 434/55 |
| 2017/0029244 A1 | 2/2017 | Madarasz et al. |
| 2019/0221036 A1* | 7/2019 | Griffin ................ A63F 13/211 |

FOREIGN PATENT DOCUMENTS

| | | |
|---|---|---|
| CN | 106467262 A | 3/2017 |
| EP | 2628697 B1 | 6/2015 |
| GB | 2129971 B | 5/1984 |
| WO | 2018002241 A1 | 1/2018 |

* cited by examiner

*Primary Examiner* — Timothy A Musselman
(74) *Attorney, Agent, or Firm* — Cantor Colburn LLP (57) ABSTRACT

An elevator simulator is provided. Aspects includes an elevator car and a simulation control element associated with the elevator car and being configured to perform an elevator ride simulation for the elevator car. Aspects also include a simulation controller configured to perform the elevator car simulation by operating the simulation control element to simulate an elevator ride for the elevator car.

19 Claims, 4 Drawing Sheets

RIDE QUALITY ELEVATOR SIMULATOR

BACKGROUND

The subject matter disclosed herein generally relates to elevator systems and, more particularly, to a ride quality elevator simulator.

Selling points for elevator systems include the overall ride quality. Assessing overall ride quality typically requires riding in an already installed elevator system. However, the ride quality assessment is restricted to the parameters of the installed elevator system. Should a user want to adjust parameters to determine ride quality, the user would be limited to identifying existing elevator systems that have the same or similar parameters. Parameters that can affect ride quality can include hoistway materials such as guide rails, ropes and belts, and operational equipment such as braking systems, dampeners, and the like.

BRIEF DESCRIPTION

According to one embodiment, an elevator system is provided. The elevator system includes an elevator car and a simulation control element associated with the elevator car and being configured to perform an elevator ride simulation for the elevator car. And a simulation controller configured to perform the elevator car simulation by operating the simulation control element to simulate an elevator ride for the elevator car.

In addition to one or more of the features described above, or as an alternative, further embodiments of the elevator system may include that the simulation control element comprises a platform having an actuator, wherein the elevator car is arranged on the platform.

In addition to one or more of the features described above, or as an alternative, further embodiments of the elevator system may include that simulating the elevator ride comprises operating the actuator to impart multi-axial force by the platform to simulate movement of the elevator car along an x-axis, a y-axis, and a z-axis.

In addition to one or more of the features described above, or as an alternative, further embodiments of the elevator system may include that the simulation control element comprise an audio control element.

In addition to one or more of the features described above, or as an alternative, further embodiments of the elevator system may include that simulating the elevator ride comprises operating the audio control element to simulate movement of the elevator car.

In addition to one or more of the features described above, or as an alternative, further embodiments of the elevator system may include that the simulation control element comprise a visual control element.

In addition to one or more of the features described above, or as an alternative, further embodiments of the elevator system may include that simulating the elevator ride comprises operating the visual control element to simulate movement of the elevator car.

In addition to one or more of the features described above, or as an alternative, further embodiments of the elevator system may include that the simulation controller is further configured to receive elevator parameters data and analyze the elevator parameters data to generate an operational range for the simulation control element to simulate one or more quality metrics for the elevator car.

In addition to one or more of the features described above, or as an alternative, further embodiments of the elevator system may include that the elevator car simulation is performed based at least in part on the operational range for the simulation control element.

In addition to one or more of the features described above, or as an alternative, further embodiments of the elevator system may include that the one or more quality metrics comprises at least one of elevator car sag, elevator car bounce, elevator car re-leveling, and elevator car vibration.

In addition to one or more of the features described above, or as an alternative, further embodiments of the elevator system may include that generating the operational range for the simulation control element comprises applying a machine learning model to the elevator parameter data to generate expected ride quality values for the one or more quality metrics and generating the operational range for the simulation control element based on the expected ride quality values.

In addition to one or more of the features described above, or as an alternative, further embodiments of the elevator system may include that the operational range is generated based on historical elevator ride quality data.

In addition to one or more of the features described above, or as an alternative, further embodiments of the elevator system may include that the elevator car comprises an elevator door and the elevator car simulation includes the simulation controller operating the simulated control element to simulate an operation of the elevator door.

In addition to one or more of the features described above, or as an alternative, further embodiments of the elevator system may include that the simulation controller is further configured to receiving an input from a user and responsively operate the control element based on the input from the user.

In addition to one or more of the features described above, or as an alternative, further embodiments of the elevator system may include that the simulation controller is further configured to operate the simulation control element to simulate at least one of an emergency elevator car stop and a power loss elevator car stop.

According to one embodiment, a method is provided. The method includes receiving elevator parameters data Analyzing the elevator parameters data to generate an operational range for a simulation control element and simulating an elevator ride in an elevator car by operating the simulation control element within the operational range.

In addition to one or more of the features described above, or as an alternative, further embodiments of the method may include that the simulation control element comprises a platform having an actuator, wherein the elevator car is arranged on the platform.

In addition to one or more of the features described above, or as an alternative, further embodiments of the method may include that simulating the elevator ride comprises operating the actuator to impart multi-axial force by the platform to simulate movement of the elevator car along an x-axis, a y-axis, and a z-axis.

In addition to one or more of the features described above, or as an alternative, further embodiments of the method may include that the simulation control element comprise an audio control element and simulating the elevator ride comprises operating the audio control element to simulate movement of the elevator car.

In addition to one or more of the features described above, or as an alternative, further embodiments of the method may include that the simulation control element comprise a visual control element and simulating the elevator ride comprises operating the visual control element to simulate movement of the elevator car.

BRIEF DESCRIPTION OF THE DRAWINGS

The present disclosure is illustrated by way of example and not limited in the accompanying figures in which like reference numerals indicate similar elements.

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
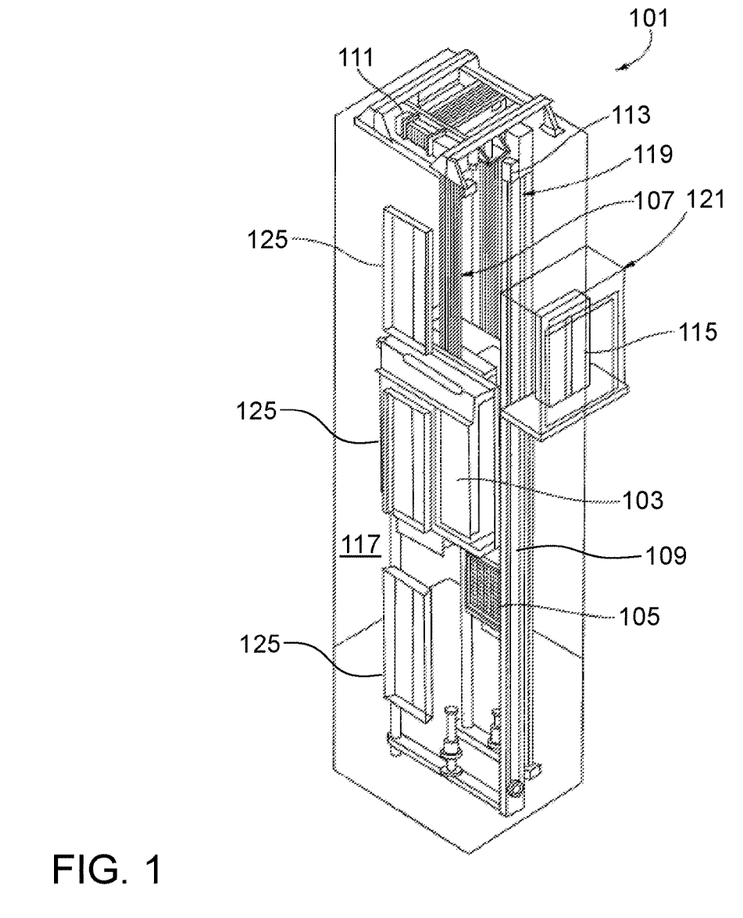
FIG. 1 is a schematic illustration of an elevator system that may employ various embodiments of the disclosure.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and/or ropeless elevators, may employ embodiments of the present disclosure. FIG. 1 is merely a non-limiting example presented for illustrative and explanatory purposes.

Figure 2:
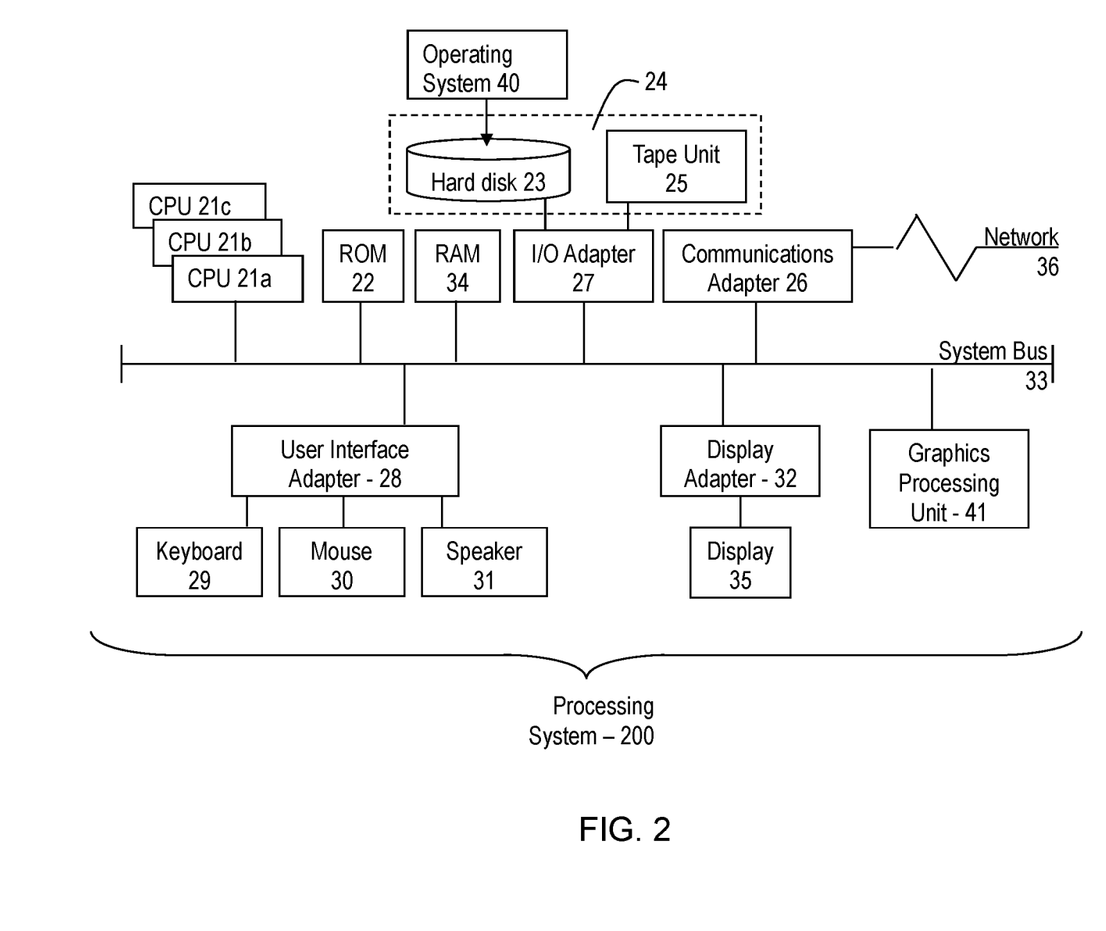
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

Turning now to an overview of technologies that are more specifically relevant to aspects of the disclosure, the ride quality of elevators (e.g., noise and vibration during running, sag and bounce response at landing floors, etc.) is currently evaluated with certain metrics. These metrics have been developed over the years and include g-force metrics, noise (decibel) metrics, damping ratio, dynamic sag, and the like. Current approaches to evaluating these metrics require the use of fully functioning elevator systems already installed in buildings. To test ride quality under certain conditions, a building elevator system with matching conditions is needed to ensure accurate testing. Given the large number of possible unique elevator configurations, difficulty can arise in finding existing elevator systems that match the desired test configuration. Also, testing can require the existing elevator system be taken offline either partially or completely. In addition, for perspective elevator system customers to experience the ride quality of a system that they are interested in purchasing, the prospective customers would need to visit an existing elevator system that closely aligns with the type of elevator system that they are interested in purchasing. A need exists to test elevator ride quality and to be able to immerse perspective customers in the ride quality for potential purchases.

Turning now to an overview of the aspects of the disclosure, one or more embodiments address the above-described shortcomings of the prior art by providing a system for simulating elevator ride quality. The system for simulating elevator ride quality creates an immersive environment allowing for playback of elevator quality metrics for actual and/or simulated elevator systems. The system includes a motion platform that can operate an elevator cab to simulate the vertical motion of an elevator cab using, for example, a linear motor. A ride quality elevator simulator described herein is a programmable, self-contained, space-efficient device that creates an immersive environment to allow for the identification, assessment and optimization of key parameters to optimize elevator ride quality.

Figure 3:
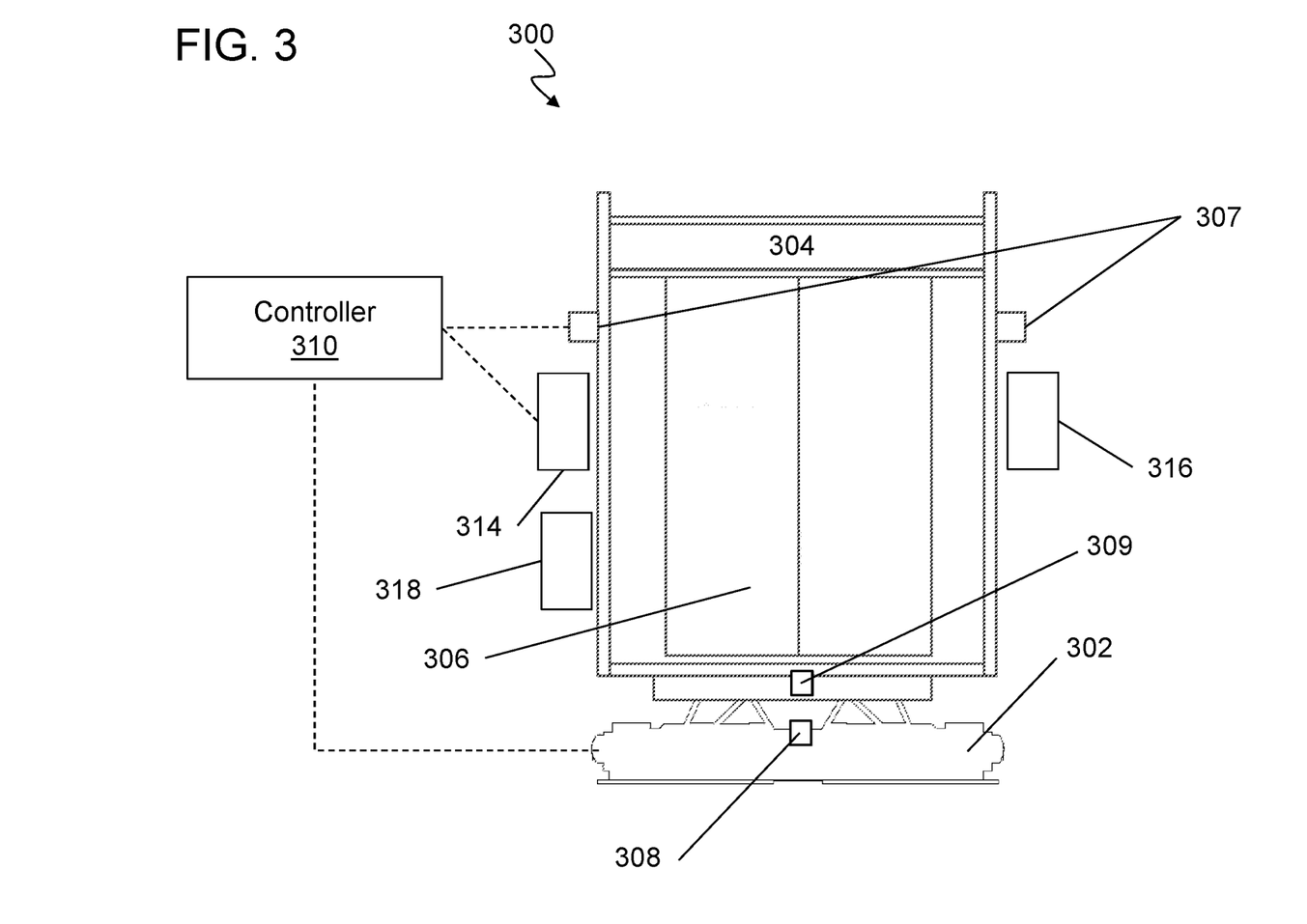
FIG. 3 depicts a system for simulating elevator car operations according to one or more embodiments of the disclosure.

Turning now to a more detailed description of aspects of the present disclosure, in FIG. 3, there is shown a system 300 for simulating elevator car operation according to one or more embodiments. The system 300 includes an elevator car 304 arranged on a platform with a controllable motion base 302 that is operable by a controller 310. The controllable motion base 302 includes sensing elements 308 and 309. The elevator car 304 includes a controllable elevator door 306, controllable actuators 307, an audio control element 314, a visual control element 316, and a motion control element 318 that can each be operated by the controller 310. In one or more embodiments, the controllable motion base 302 provides actuation to move the elevator cab 304 in one or more degrees of freedom to simulate at a minimum some aspects of the vertical motion of simulated elevator operation. The controllable actuators 307 and motion control element 318 can generate forces or movements acting on the elevator car 304 to simulate lateral motion and vibrations that typically are present in elevator systems. In one or more embodiments, the audio control element 314 and visual control element 316 can be utilized to reproduce associated sounds and visual effects that are created by the elevator motion using a pre-programmed selection of audio and visual effects that can be synchronized with the simulated elevator motion. The elevator door 306 can also be controlled and synchronized with the control motions and audio/visual effects to simulate various aspects of the elevator door system. In one or more embodiments, the controllable motion base 302 can include control elements (e.g., simulation control elements) such as, for example, motors and actuators for moving the controllable motion base 302 in three dimensions (3D) along an x-axis, a y-axis, and a z-axis. For example, a hydraulic position actuator can be utilized to move the controllable motion base 302 up and down (z-axis) as well as move the controllable motion base 302 horizontally (x-axis and y-axis) to simulate vibration and/or vertical or horizontal movement of the elevator car 304. In one or more embodiments, the controllable motion base 302 can include three rotational angles, theta-x, theta-y, and theta-z for simulating rotational aspects for the simulation system 300.

In one or more embodiments, the controller 310 can be implemented on the processing system 200 found in FIG. 2. Additionally, a cloud computing system can be in wired or wireless electronic communication with one or all of the elements of the system 300. Cloud computing can supplement, support or replace some or all of the functionality of the elements of the system 300. Additionally, some or all of the functionality of the elements of system 300 can be implemented as a node of a cloud computing system. A cloud computing node is only one example of a suitable computing node and is not intended to suggest any limitation as to the scope of use or functionality of embodiments described herein.

In one or more embodiments, the system 300 can simulate elevator car operation for the elevator car 304 through controller 310 manipulations of control elements of the controllable motion base 302. Simulation of elevator car operation includes the simulation of the loading and unloading of the elevator car 304 by passengers or objects. There is an associated sag and bounce effect that can occur when entering an elevator car. Sag and bounce refer to the up and down movement of the elevator car 304 during loading and unloading. Sag and bounce is the result of the elevator belts or ropes stretching due to the change in weight of the elevator car as passengers get on or off the car. The controller 310 can receive an input including elevator system parameters. The controller 310 analyzes the parameters to develop operational parameters to simulate the expected sag and bounce based on the supplied elevator system parameters. The controller 310 can adjust the various gain settings in its internal processing algorithms to modify the characteristics of the controlled response of the motion base simulator 302 and actuators 307 to reproduce the desired sag and bounce characteristics. For example, very high rise elevator systems with long lengths of ropes or belts deflect (sag) more as passengers enter and exit the car. To reproduce this effect, the elevator ride quality simulator can adjust some gains in the controller 310 which result in the controllable motion base 302 having more sag as passengers enter and exit the simulator. In one or more embodiments, simulation of the elevator car operations includes the simulation of elevator car re-leveling. Re-leveling is an elevator control mode that is utilized to move the elevator car 304 back to a landing if the elevator car 304 when there is greater than a threshold level of error. In one or more embodiments, the threshold level of error can be a half inch of error.

In one or more embodiments, simulation of elevator car operation includes the simulation of up and down movement between floors in an elevator system. The simulation of up and down movement can be performed through the controller 310 operating the controllable motion base 302, audio element 314, and visual element 316. For example, the controllable motion base 302 can have actuators that cause vibration to simulate the movement of the elevator car 304. Also, the audio elements 314 can provide sounds and noises to immerse a passenger in the elevator car 304 operation simulation and the visual elements 316 can simulate up and down movement through changes in lighting. For example, the visual elements 316 can provide visual cues through controller LED lights that show the car as moving up or down as a passenger looks at the visual cues. These visual cues can also simulate velocity of the elevator car 304. In one or more embodiments, the elevator car 304 can include gaps allowing for a passenger to see outside the elevator car 304 into a simulated hoistway where the visual elements 316 can be housed to provide the visual cues. In one or more embodiments, the controllable motion base 302 can simulate vertical movement through the use of actuators to provide acceleration and deceleration. In one or more embodiments, the controllable motion base 302 vertical movement range can be limited to less than a floor length. However, the controllable motion base 302 simulates longer vertical movement through initial acceleration of the elevator car 304, the vibration of the elevator car 304 during travel time, and deceleration (through up/down actuators) to simulate a full elevator ride. The audio element 314 and visual element 316 can supplement the controllable motion base 302 by providing audio and visual cues to immerse a passenger in the elevator ride simulation. The controllable motion base 302 and its controller 310 can create a vertical motion profile that reproduces some motion cues to the riding passengers in the simulator that create an illusion of extending vertical motion. In one or more embodiments, the controller 310 can create a motion profile that filters a conventional elevator vertical motion profile that preserves some of the higher derivative motion states, for example jerk (the derivative of acceleration). This creates motion cues, such as vibration patterns synchronized in time that can be synchronized with audio elements 314 and visual elements 316 to give the riding passengers in the elevator ride quality simulator the impression they are moving up and down in a real elevator system. In one or more embodiments, the controllable motion base 302 can simulate an emergency stop and a power loss stop to demonstrate what occurs when a building loses power or must make an emergency stop while travelling in a hoistway.

In one or more embodiments, the controller 310 can utilize historical elevator parameter data and associated ride quality to assist with simulating elevator car operations. For example, ride quality for existing elevator systems can be utilized to provide simulated elevator car operations based on the existing systems parameters installed at a location. Machine learning models can be utilized to learn and adjust parameters to account for ride quality. For example, the historical data regarding sag and bounce for elevator systems utilizing steel roping versus belts can be fed into a clustering algorithm to develop expected sag and bounce range for the different elevator systems using steel roping. By clustering the historical data, operational tolerances can be utilized by the controller 310 in the simulation system 300 to simulate expected sag and bounce based on the same or similar parameters for steel roping.

In one or more embodiments, the system 300 can simulate expected elevator car operations when the elevator door 306 opens and closes. The controller 310 can operate the controllable motion base 302 and actuators 307 to provide expected vibration for different elevator door 306 construction. For example, elevator doors in building lobbies may have heavier decoration to match the decoration of the lobby. Due to this added weight, as the elevator door 306 opens, the vibration in the elevator car 304 can increase in the simulation. To simulate elevator door 306 operations, the controller 310 can receive parameters for the elevator door 306 such as exterior material and weight, and adjust actuator operation to simulate how the elevator car 304 will vibrate as the doors 306 open and close.

In one or more embodiments, the system 300 can include a passenger input device that allows the passenger to adjust any parameters of the system 300. For example, a passenger could input that they would like a softer sag and bounce and the system 300 adjusts the parameters to provide a softer sag and bounce. The passenger could, for example, be a potential purchaser of an elevator system and wish to adjust the ride quality parameters. The simulator can adjust the elevator ride quality and provide an equipment listing that could provide the required ride quality. For example, in one or more embodiments the effect of elevator guide rail misalignments and the load imbalance in the elevator car could be simulated by creating disturbance forces in the lateral force actuators 307 that car created by mathematical models stored in the controller 310. In another example, one or more embodiments could simulate lateral vibrations in the car due to imperfections in the elevator guide rollers as they run along the guide rails at speed with programmed signals from the controller 310 creating forces in the lateral force actuators 307. In yet another example, one or more embodiments could simulate the vertical vibrations created by out of round rope or belt pulleys or sheaves with programmed signals from the controller 310 creating forces in the controlled motion base 302.

Figure 4:
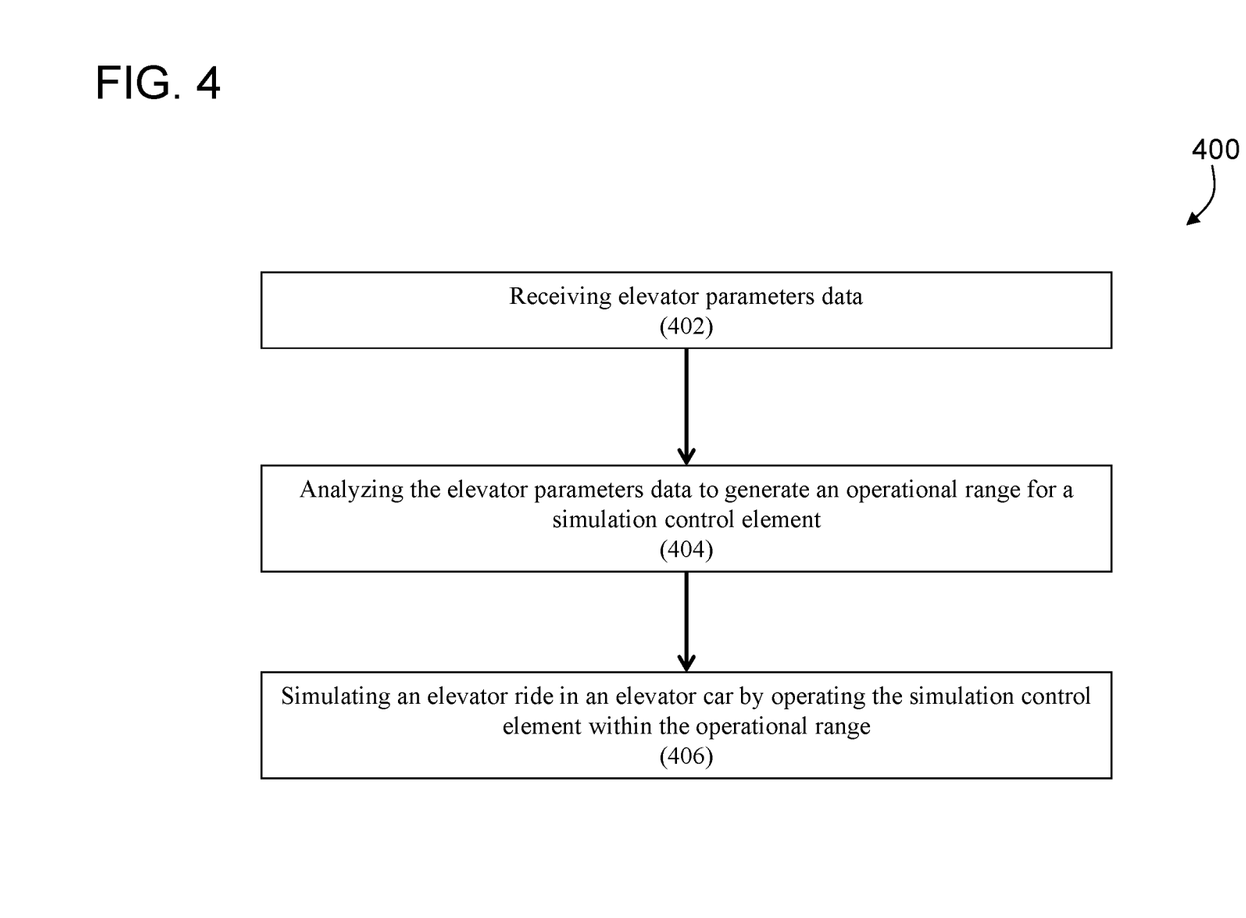
FIG. 4 depicts a flow diagram of a method for simulating elevator car operations according to one or more embodiments of the disclosure.

FIG. 4 depicts a flow diagram of a method for supervisory control of the elevator ride quality simulator according to one or more embodiments. The method 400 includes receiving elevator parameters data, as shown in block 402. Elevator parameters data can include data associated with materials, equipment, and other features for an elevator system that would affect ride quality. For example, certain types of braking systems can provide a range of ride smoothness for passengers. The method 400, at block 404, also includes analyzing the elevator parameters data to generate an operational range for a simulation control element. And at block 406, the method 400 includes simulating an elevator ride in an elevator car by operating the simulation control element within the operational range. The control element can include Additional processes may also be included. It should be understood that the processes depicted in FIG. 4 represent illustrations and that other processes may be added or existing processes may be removed, modified, or rearranged without departing from the scope In one or more embodiments of the controller method 400 the elevator parameters data 402 could be recordings of the motion and sound from a particular elevator in the field. This data would then be directly exported as commanded playback values in the simulator commands 406.

In another operational mode, one or more embodiments of the controller method 400 could input data on the elevator components and their operational parameters and settings as the elevator parameters 402 which would then be processed using developed computer models in the analysis portion 404 to synthesize commanded values to the simulator commands 406.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator simulator comprising:
    an elevator car;
    a simulation control element associated with the elevator car and being configured to perform an elevator ride simulation for the elevator car; and
    a simulation controller configured to perform the elevator car simulation by operating the simulation control element to simulate an elevator ride for the elevator car;
    wherein the simulation controller is further configured to:
        receive elevator parameters data; and
        analyze the elevator parameters data to generate an operational range for the simulation control element to simulate one or more quality metrics for the elevator car.

2. The elevator simulator of claim 1, wherein the simulation control element comprises a platform having an actuator, wherein the elevator car is arranged on the platform.

3. The elevator simulator of claim 2, wherein simulating the elevator ride comprises:

operating the actuator to impart multi-axial force by the platform to simulate movement of the elevator car along an x-axis, a y-axis, and a z-axis; and
    operating the actuator to impart rotational force by the platform to simulate movement of the elevator car along a theta-x rotational axis, theta-y rotational axis, and theta-z rotational axis.

4. The elevator simulator of claim 1, wherein the simulation control element comprise an audio control element.

5. The elevator simulator of claim 4, wherein simulating the elevator ride comprises operating the audio control element to simulate movement of the elevator car.

6. The elevator simulator of claim 1, wherein the simulation control element comprise a visual control element.

7. The elevator simulator of claim 6, wherein simulating the elevator ride comprises operating the visual control element to simulate movement of the elevator car.

8. The elevator simulator of claim 1, wherein the elevator car simulation is performed based at least in part on the operational range for the simulation control element.

9. The elevator simulator of claim 1, wherein the one or more quality metrics comprises at least one of elevator car sag, elevator car bounce, elevator car re-leveling, and elevator car vibration.

10. The elevator simulator of claim 1, wherein generating the operational range for the simulation control element comprises:
    applying a machine learning model to the elevator parameter data to generate expected ride quality values for the one or more quality metrics; and
    generating the operational range for the simulation control element based on the expected ride quality values.

11. The elevator simulator of claim 10, wherein the operational range is generated based on historical elevator ride quality data.

12. The elevator simulator of claim 1, wherein the elevator car comprises an elevator door; and
    wherein the elevator car simulation includes the simulation controller operating the simulated control element to simulate an operation of the elevator door.

13. The elevator simulator of claim 1, wherein the simulation controller is further configured to:
    receiving an input from a user; and
    responsively operate the control element based on the input from the user.

14. The elevator simulator of claim 1, wherein the simulation controller is further configured to:
    operate the simulation control element to simulate at least one of an emergency elevator car stop and a power loss elevator car stop.

15. The method of claim 14, wherein the simulation control element comprise a visual control element; and
    wherein simulating the elevator ride comprises operating the visual control element to simulate movement of the elevator car.

16. A method for performing an elevator car simulation, the method comprising:
    receiving elevator parameters data;
    analyzing the elevator parameters data to generate an operational range for a simulation control element;
    simulating an elevator ride in an elevator car by operating the simulation control element within the operational range.

17. The method of claim 16, wherein the simulation control element comprises a platform having an actuator, wherein the elevator car is arranged on the platform.

18. The method of claim 17, wherein simulating the elevator ride comprises:
 operating the actuator to impart multi-axial force by the platform to simulate movement of the elevator car along an x-axis, a y-axis, and a z-axis; and
 operating the actuator to impart rotational force by the platform to simulate movement of the elevator car along a theta-x rotational axis, theta-y rotational axis, and theta-z rotational axis.

19. The method of claim 16, wherein the simulation control element comprise an audio control element; and
 wherein simulating the elevator ride comprises operating the audio control element to simulate movement of the elevator car.

\* \* \* \* \*